United States Patent [19]

Takeda et al.

[11] Patent Number: 4,690,465

[45] Date of Patent: Sep. 1, 1987

[54] ANTISKID HYDRAULIC PRESSURE MODULATOR FOR VEHICLE HYDRAULIC BRAKING SYSTEM

[75] Inventors: Kenji Takeda, Nukata; Mitsuo Inagaki; Hideaki Sasaya, both Okazaki; Kazuma Matsui, Toyohashi, all of Japan

[73] Assignees: Nippon Soken, Inc., Nishio; Nippondenso Co., Ltd., Kariya, both of Japan

[21] Appl. No.: 865,443

[22] Filed: May 21, 1986

[30] Foreign Application Priority Data

May 22, 1985 [JP] Japan .................. 60-108333

[51] Int. Cl.⁴ .................. B60T 8/00; B60T 8/36; B60T 13/68; B60T 15/02
[52] U.S. Cl. .................. 303/119; 188/158; 251/129.06; 310/328; 303/116
[58] Field of Search .............. 303/119, 100, 113, 114, 303/115, 116, 117, 93, 61–63, 68–69, 84 R, 110, 91, 92, 10, DIGS. 1–4; 188/181 All, 72.4, 158, 72.1, 72.3, 216, 72.6, 71.1, 106 All; 310/328; 251/129.06, 129.01–129.22; 60/545

[56] References Cited

U.S. PATENT DOCUMENTS

| 4,471,256 | 9/1984 | Igashira et al. | 310/328 |
| 4,553,059 | 11/1985 | Abe et al. | 310/328 |
| 4,602,702 | 7/1986 | Ohta et al. | 188/72.4 X |
| 4,603,920 | 8/1986 | Otsuki et al. | 303/119 X |
| 4,610,427 | 9/1986 | Igashira et al. | 251/129.06 |
| 4,618,189 | 10/1986 | Nakanishi et al. | 303/119 X |
| 4,629,039 | 12/1986 | Imoto et al. | 188/72.4 X |

FOREIGN PATENT DOCUMENTS 49-28307 7/1974 Japan .
51-6308 2/1976 Japan .
58-17169 4/1983 Japan .

*Primary Examiner*—Douglas C. Butler
*Attorney, Agent, or Firm*—Cushman, Darby & Cushman

[57] ABSTRACT

A compact, piezoelectrically operated pressure modulator for antiskid control of a hydraulic braking system. In its simplest form, the modulator comprises a body in which are formed a main hydraulic passage adapted to connect the master cylinder to a wheel cylinder, and a pressure relief passage for relieving the pressure in the wheel cylinder. The main passage is opened and closed by a normally open shutoff valve operated by a piezoelectric actuator, and the relief passage is controlled by a normally closed shutoff valve operated by an associated piezoelectric actuator. Adjusting mechanisms are provided to adjust the axial position of the piezoelectric elements of the actuators in such a manner that the valve clearance of the shutoff valves is adjusted to an optimal amount.

14 Claims, 6 Drawing Figures

104F 98F 70F 70R 98R 104R

ANTISKID HYDRAULIC PRESSURE MODULATOR FOR VEHICLE HYDRAULIC BRAKING SYSTEM

BACKGROUND OF THE INVENTION

1. Field of the Invention

The present invention relates to an antiskid hydraulic pressure modulator for use in a hydraulic braking system of a vehicle for controlling hydraulic pressure applied to wheel cylinders.

2. Description of the Related Art

Known in the art are hydraulic braking systems with antiskid arrangements wherein the hydraulic pressure applied to wheel cylinders is controlled in accordance with varying ground surface conditions and vehicular conditions so as to stop a moving vehicle within a shortened braking distance while retaining adequate steerability of the vehicle.

An antilock control system disclosed in Japanese Examined Patent Publication No. 49-28307 includes a normally-open solenoid-operated input control valve disposed in a main hydraulic conduit connecting a master cylinder with wheel cylinders, and a normally-closed solenoid-operated output control valve disposed in a hydraulic pressure relief conduit connected between the wheel cylinders and a reservoir. By closing the input control valve and opening the output control valve, the brake fluid in the hydraulic braking circuit is released toward the reservoir thereby temporarily reducing the braking force to release any locking of the vehicle wheels. The brake fluid released to the reservoir is then re-charged by a hydraulic pump into the hydraulic circuit. The hydraulic pressure in the circuit is maintained at a constant pressure by closing both the input and output control valves, and the pressure is increased again by opening the input control valve with the output control valve closed. In this manner, antiskid control is achieved by controlling the hydraulic pressure in the braking circuit in three modes; the pressure relieving mode, the constant pressure mode, and pressure increasing mode.

It is also known to use a solenoid-operated three-position valve in place of the combination of an input valve and an output valve, as disclosed in FIG. 3 of Japanese Examined Patent Publication No. 51-6308. An example of such a solenoid-operated three-position valve is disclosed in Japanese Examined Utility Model Publication No. 58-17169.

In both cases, however, it has been recognized that, because the responsiveness of the solenoid operated control valves is inherently limited, the use of solenoid operated valves has been a bar to improve the overall responsiveness of the antiskid control system in such a manner that the vehicle can be stopped within a minimum braking distance. Another disadvantage of solenoid valves is that they are large in size and have a considerable weight. This has made it difficult to assemble all of the essential components of the antiskid system into a single unit.

SUMMARY OF THE INVENTION

The primary object of the invention is to provide an improved antiskid hydraulic pressure modulator which has a high responsiveness.

Another important object of the invention is to provide an antiskid hydraulic pressure modulator which is compact in size and light in weight and in which all the essential components are incorporated into a single unit which is readily connected to the existing hydraulic braking system.

In its simplest form, the antiskid hydraulic pressure modulator according to the invention comprises (a) a body having a main hydraulic passage for transmitting the hydraulic pressure generated in the master cylinder to the wheel cylinder and a relief passage for relieving the hydraulic pressure in the wheel cylinder, (b) a normally open first shutoff valve in the body for providing and interrupting fluid flow through the main passage, (c) a first piezoelectric actuator received in the body for operating the first shutoff valve in response to variations in the voltage applied thereto, (d) a normally closed second shutoff valve in the body for providing and interrupting fluid flow through the relief passage, and (e) a second piezoelectric actuator received in the body for operating the second shutoff valve in response to variations in the voltage applied thereto.

Since a piezoelectric element expands and contracts almost instantaneously in response to voltage application and voltage drop, the responsiveness of the piezoelectrically operated shutoff valves is considerably improved as compared with the conventional solenoid operated valves. Furthermore, because the piezoelectric actuators are much more compact than solenoid actuators, it is possible to incorporate as many piezoelectrically operated shutoff valves as required into a single modulator body thereby providing a compact hydraulic pressure modulator. The modulator in the form of a compact unitary unit may be readily mounted on a vehicle and easily connected to the hydraulic braking system of the vehicle.

However, in view of the fact that the amount of axial expansion and contraction of the piezoelectric element is very limited, i.e., normally in the range of about 40 to 50 micrometers for a piezoelectric element having an axial length of about 50 millimeters, it is desirable that piezoelectrically operated shutoff valves be provided with means for precisely adjusting the axial position of the piezoelectric element, in order to ensure a reliable operation of the shutoff valves. Such an adjusting mechanism also must be designed to facilitate access thereto.

According to the preferred embodiment of the invention, therefore, the antiskid modulator further comprises mechanisms for adjusting the axial position of respective piezoelectric elements, with the adjusting mechanism for the first piezoelectric actuator being arranged at one lateral side of the body and the adjusting mechanism for the second piezoelectric actuator being arranged at the other lateral side of the body. With this arrangement, it is possible to obtain ready access to the adjusting mechanisms so as to adjust the axial position of the piezoelectric elements in such a manner that the piezoelectric shutoff valves are operated with optimal accuracy.

Preferably, the first shutoff valve, first piezo-electric actuator, and adjusting mechanism therefor are aligned coaxially with and opposite to the second shutoff valve, second piezoelectric actuator, and adjusting mechanism therefor, respectively. This simplifies the arrangement of various passages in the body and enables the assembly of a more compact unitary antiskid modulator.

In another aspect, this invention provides an antiskid hydraulic pressure modulator comprising (a) a body having a main hydraulic passage for transmitting the hydraulic pressure from the master cylinder to the wheel cylinder, a pressure relief passage for relieving the hydraulic pressure at the wheel cylinder, and a return passage for returning the relieved brake fluid to the main passage, (b) a normally open first shutoff valve in the body for providing and interrupting the fluid flow through the main passage, (c) a first piezo-electric actuator received in the body for operating the first shutoff valve in response to variations in the voltage applied thereto, (d) a first adjusting mechanism for adjusting the axial position of the piezoelectric element of the first piezoelectric actuator, (e) a normally closed second shutoff valve in the body for providing and interrupting the fluid flow through the relief passage, (f) a second piezoelectric actuator in the body for operating the second shutoff valve in response to variations in the voltage applied thereto, (g) a second adjusting mechanism for adjusting the axial position of the piezoelectric element of the second piezoelectric actuator, (h) a reservoir mounted to the body for storing the brake fluid released through the pressure relief passage, and (i) a hydraulic pump mounted to the body for pumping the brake fluid in the reservoir back to the return passage. It is preferable to arrange the first and second adjusting mechanisms at the lateral sides of the body in order to provide ready access thereto.

Preferably, the antiskid modulator further comprises a passage with a check valve allowing communication between the return passage and the portion of the relief passage located upstream of the second shutoff valve. With this arrangement, the brake fluid in the wheel cylinder is smoothly returned to the master cylinder upon release of the brake pedal.

In still another aspect, this invention provides an antiskid hydraulic pressure modulator which is adapted to independently control the hydraulic pressure applied from a master cylinder to two independent wheel cylinders of a hydraulic braking system. The modulator comprises (a) a body having two main hydraulic passages for independently transmitting the hydraulic pressure from the master cylinder to two wheel cylinders, two relief passages for independently relieving the hydraulic pressure in respective wheel cylinders, and a common return passage for returning relieved brake fluid to the main passages, (b) a normally open first piezoelectric shutoff valve, provided in the body for each of two main passages, for providing and interrupting fluid flow through the main passages, (c) a normally closed second piezoelectric shutoff valve, provided in the body for each of the two relief passages, for providing and interrupting fluid flow through the relief passages, (d) a reservoir mounted to the body for storing the brake fluid relieved through the relief passages, (e) a hydraulic pump mounted to the body for pumping the brake fluid in the reservoir toward the return passage, and (f) an adjusting mechanism, provided for each of the first and second shutoff valves, for adjusting the axial position of the piezoelectric element of the respective shutoff valves, with the shutoff valves and the adjusting mechanisms being arranged in such a manner that the adjusting mechanisms are located at the lateral sides of the body. In this form, it is preferable that two of the first and second shutoff valves are paired and arranged opposite to each other, the different pairs of shutoff valves being arranged adjacent to each other.

In a further aspect, this invention provides an antiskid modulator adapted for use with a hydraulic braking system having a tandem master cylinder connected through independent hydraulic circuits to a first group of wheel cylinders which may be front wheel cylinders and to a second group of wheel cylinders which may be rear wheel cylinders. The antiskid modulator comprises (a) a body having a pair of first main hydraulic passages for transmitting the hydraulic pressure from the first delivery port of the tandem master cylinder independently to the first group of wheel cylinders, a pair of first relief passages for independently relieving the hydraulic pressure in the first group of wheel cylinders, a first common return passage for returning the brake fluid relieved through the first relief passages back to the first main passages, a second main passage for transmitting the hydraulic pressure from the second delivery port of the tandem master cylinder to the second group of wheel cylinders, a second relief passage for relieving the hydraulic pressure in the second group of wheel cylinders, and a second common return passage for returning the brake fluid relieved through the second relief passage back to the second main passage, (b) a normally open first piezoelectric shutoff valve, provided in the body for each of the main hydraulic passages, for providing and interrupting fluid flow therethrough, (c) a normally closed second piezoelectric shutoff valve, provided in the body for each of the relief passages, for providing and interrupting fluid flow therethrough, (d) a first reservoir mounted to the body for storing the brake fluid relieved through the first relief passage, (e) a second reservoir mounted to the body for storing the brake fluid relieved through the second relief passage, (f) a first hydraulic pump mounted to the body for pumping the brake fluid in the first reservoir to the first return passage, (g) a second hydraulic pump mounted to the body for pumping the brake fluid in the second reservoir to the second return passage, (h) and adjusting mechanism, provided for each of the first and second piezoelectric shutoff valves, for adjusting the axial position of the piezoelectric element of corresponding shutoff valve; the shutoff valves and the associated adjusting mechanisms being arranged in such a manner that the adjusting mechanisms are located at the lateral side of the body.

In this from, the first piezoelectric shutoff valves may be arranged opposite to and coaxially aligned with the second piezoelectric shutoff valves, respectively.

Preferably, one group of the adjusting mechanisms is arranged at one lateral side of the body, the other group being arranged at the other lateral side of the body.

These and other features of the invention will be more fully understood from the following description in conjunction with the accompanying drawings.

DESCRIPTION OF THE PREFERRED EMBODIMENTS

Figure 1:
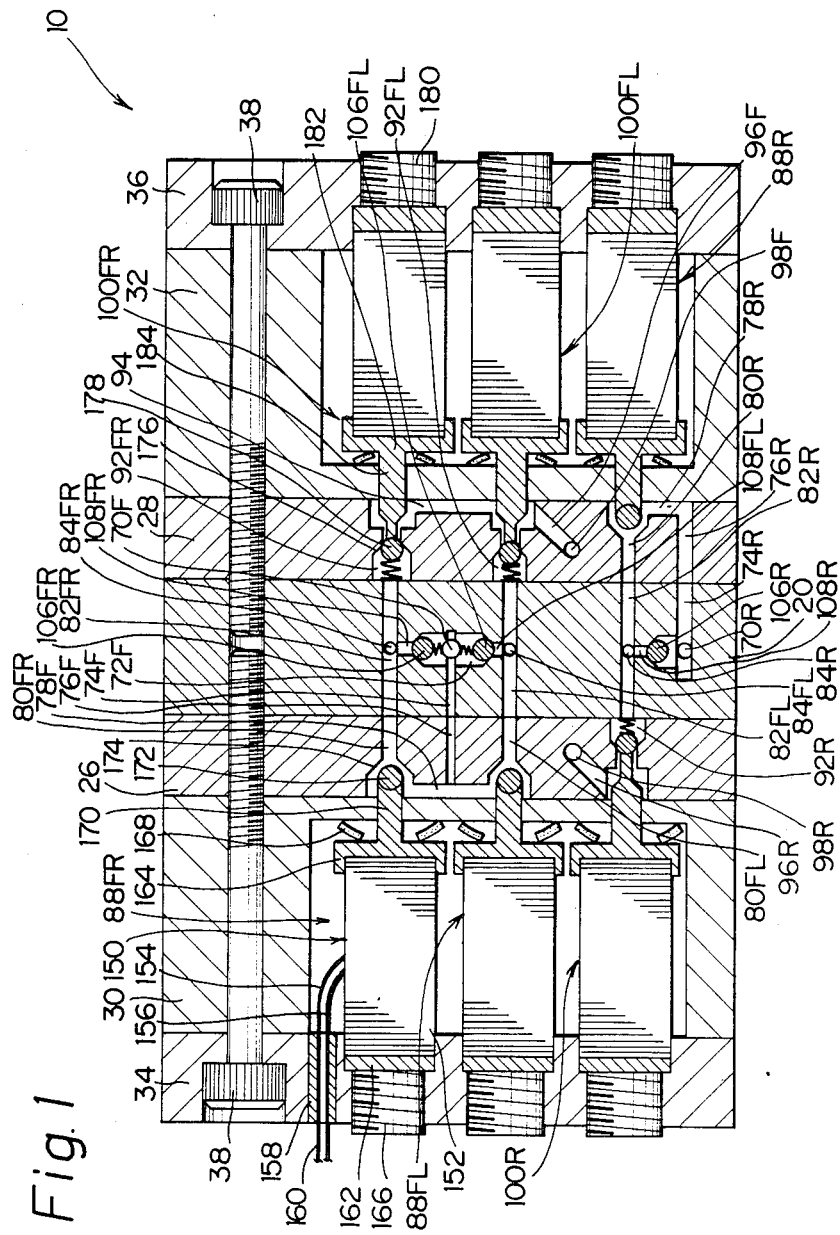
FIG. 1 is a cross-sectional view, taken along the line I—I of FIG. 2, of the antiskid modulator according to an embodiment of the invention.

Referring to the drawings, there is shown an hydraulic pressure modulator according to one embodiment of the invention which is suitable for use with a vehicle hydraulic braking system having a tandem master cylinder connected to independent front and rear wheel hydraulic circuits. The modulator is designed to control the hydraulic pressure in the front left wheel cylinder, front right wheel cylinder, and two rear wheel cylinders independently from each other.

Figure 2:
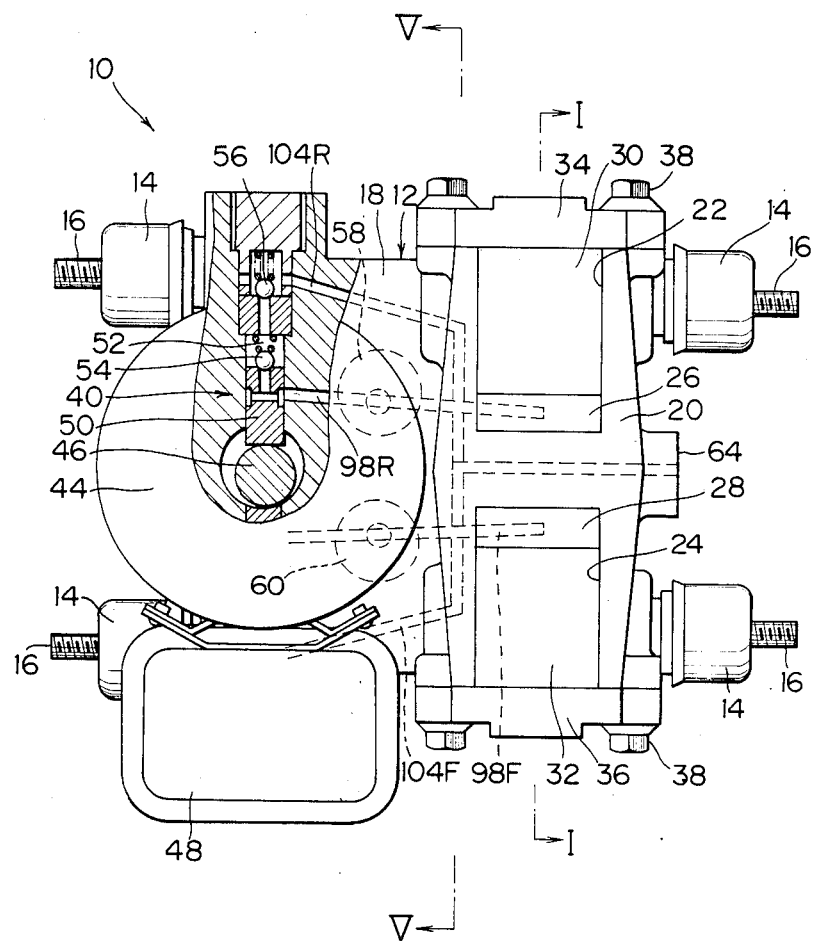
FIG. 2 is a top plan view of the modulator.

The antiskid hydraulic pressure modulator 10 comprises a base 12 having a plurality of bolts 16 carrying elastomeric antivibration bushings 14. The modulator 10 may be mounted to a suitable support member of a vehicle body by nuts engaging the respective bolts 16. The base 12 of the modulator includes a horizontal portion 18 and an upright portion 20 integral therewith. The upright portion 20 is provided with a pair of opposite rectangular recesses 22 and 24 (FIG. 2) throughout the entire height thereof to present an H-shaped horizontal cross section. The recesses 22 and 24 respectively receive valve plates 26 and 28 and actuator housings 30 and 32 (FIGS. 1 and 2). The lateral sides of the upright portion 20 are closed by covers 34 and 36. The valve plates 26 and 28, the actuator housings 30 and 32, the covers 34 and 36, and the upright portion 20 of the base 12 are fastened together by a plurality of through bolts 38 to make up a body of the modulator 10.

Figure 3:
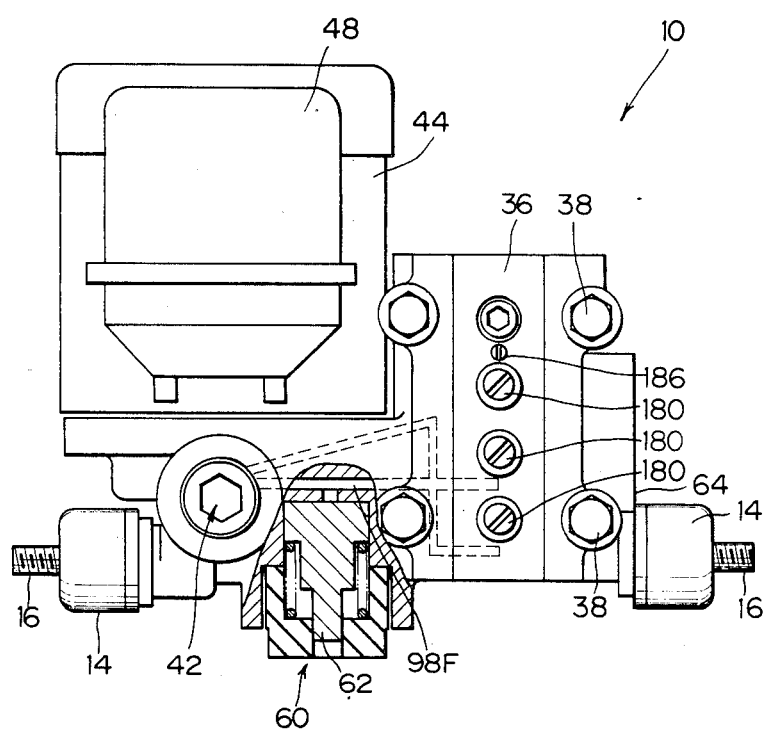
FIG. 3 is a side elevational view of the modulator.

A pair of diametrically opposite hydraulic pumps 40 and 42 are mounted to the horizontal portion 18 of the base 12; note, one pump 40 is shown in FIG. 2 and the other pump 42 is shown in FIG. 3. These pumps 40 and 42 are adapted to be commonly driven by eccentric shaft 46 (FIG. 2) of an electric motor 44 mounted to the horizontal portion 18 and provided with a relay 48. The pumps 40 and 42 may be conventional plunger type pumps. The pump 40 comprises a plunger 50, a pumping chamber 52, a suction check valve 54, and a delivery check valve 56. The other pump 42 is identical in structure to the pump 40.

The horizontal portion 18 of the base 12 is further provided with a pair of reservoirs 58 and 60 (FIGS. 2 and 3) of the conventional design and identical with each other. These reservoirs 58 and 60, respectively, are provided with a spring-biased piston 62 (FIG. 3) for storing the brake fluid under a pressure of several atmospheres.

Figure 4:
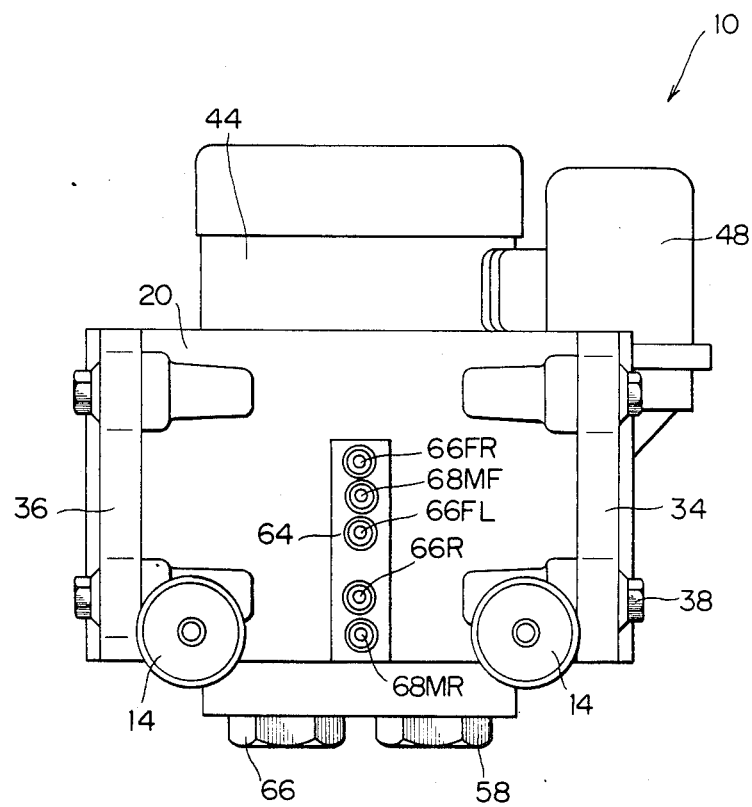
FIG. 4 is a front elevational view of the modulator.

In order to facilitate connection to hydraulic lines of the braking system, various input and output ports of the modulator 10 are arranged in an integrated fashion at the frontal projection 64 of the base 12. In the illustrated embodiment, the frontal projection 64 is provided, in the order of from the top to the bottom, with a front right output port 66FR to be connected to the front right wheel cylinder, a front input port 68MF to be connected to the front delivery port of the master cylinder, a front left output port 66FL to be connected to the front left wheel cylinder, a rear output port 66R to be connected to the rear wheel cylinders, and a rear input port 68MR to be connected to the rear delivery port of the master cylinder (FIG. 4). However, the arrangement of these ports is illustrative only and these ports may be arranged in a different order.

All of the various passages connecting these ports are provided internally of the modulator body and, in the illustrated embodiment, are formed within the base 12 and the valve plates 26 and 28, as described below.

Referring first to the front main hydraulic passages connecting the front input port 68MF to the front output ports 66FR and 66FL, the vertical portion 20 of the base 12 is provided with a horizontal passage 70F (FIG. 1) extending rearward at a right angle to the plane of FIG. 1. This passage 70F opens into a valve chamber 72F in the vertical portion 20. This valve chamber 72F is in fluid communication through a horizontal passage 74F in the vertical portion 20 with a horizontal passage 76F in the valve plate 26 which opens into a groove 78F (FIG. 1). As shown in FIG. 1, the groove 78F is communicated through a passage 80FR in the valve plate 26 and through a passage 82FR in the vertical portion 20 and through a passage 84FR which extends rearward perpendicular to the plane of FIG. 1 to merge into the front right input port 66FR. These passages 70F, 74F, 76F, 78F, 80FR, 82FR, and 84FR together make up the front right main hydraulic passage 86FR (FIG. 6) for transmitting the hydraulic pressure from the master cylinder to the front right wheel cylinder 206FR. As shown in FIG. 1, a normally open piezoelectric shutoff valve 88FR is disposed in the front right main hydraulic passage 86FR in such a manner as to provide and interrupt fluid flow therethrough.

Similarly, the front left main hydraulic passage 86FL (FIG. 6) for connecting the front input port 68MF with the front left output port 66FL (FIG. 4) comprises the passage 70F, the passage 74F, the passage 76F, the groove 78F, a passage 80FL in the valve plate 26, a passage 82FL in the vertical portion 20, and a passage 84FL (FIG. 1) which opens into the output port 66FL (FIG. 4). This front left main hydraulic passage 86FL is opened and closed by a normally open piezoelectric shutoff valve 88FL (FIG. 1) disposed therein.

The rear main hydraulic passage 86R (FIG. 6) connecting the rear input port 68MR with the rear output port 66R (FIG. 4) comprises a passage 70R in the vertical portion 20 and communicated with the input port 68MR, a passage 74R in the vertical portion 20, a passage 76R in the valve plate 28, a groove 78R in the valve plate 28, a passage 80R in the valve plate 28, a passage 82R in the vertical portion 20, and a passage 84R connected to the output port 66R (FIG. 1). A normally open piezoelectric valve 88R is provided in this rear main hydraulic passage 86R to provide and interrupt fluid flow therethrough.

Relief passages for relieving the hydraulic pressure in respective wheel cylinders are arranged in the modulator body in the following manner.

A front right relief passage 90FR (FIG. 6) for relieving the pressure at the front right wheel cylinder 206FR includes the passage 82FR in the vertical portion 20, a passage 92FR in the valve plate 28, a groove 94 in the valve plate 28, a passage 96F in the valve plate 28, and a passage 98F (FIG. 1). The passage 98F is formed in the valve plate 28 and the base 12 and is in fluid communication with the reservoir 60 and the pumping chamber of the pump 42 (FIG. 2). A normally closed piezoelectric shutoff valve 100FR is provided in the relief passage 90FR to provide and interrupt fluid flow therethrough (FIG. 1).

A front left relief passage 90FL (FIG. 6) for relieving the hydraulic pressure at the front left wheel cylinder 206FL consists of the passage 82FL in the vertical portion 20, a passage 92FL in the valve plate 28, the passage 96F in the valve plate 28, and the passage 98F in the valve plate 28 (FIG. 1). The front left relief passage 90FL is provided with a normally closed piezoelectric shutoff valve 100FL that is adapted to provide and interrupt fluid flow through the relief passage 90FL.

A rear relief passage 90R (FIG. 6) comprises the passage 82R in the vertical portion 20, a passage 92R in the valve plate 26, a passage 96R in the valve plate 26, and a passage 98R (FIG. 1). The passage 98R is provided in the valve plate 26 and the base 12 to be in fluid communication with the reservoir 58 and the pumping chamber 52 of the hydraulic pump 40 (FIGS. 2 and 3). Fluid flow through the rear relief passage 90R is controlled by a normally closed piezoelectric shutoff valve 100R (FIG. 1).

Passages for returning the relieved brake fluid to respective main hydraulic passages will be described next.

Figure 5:
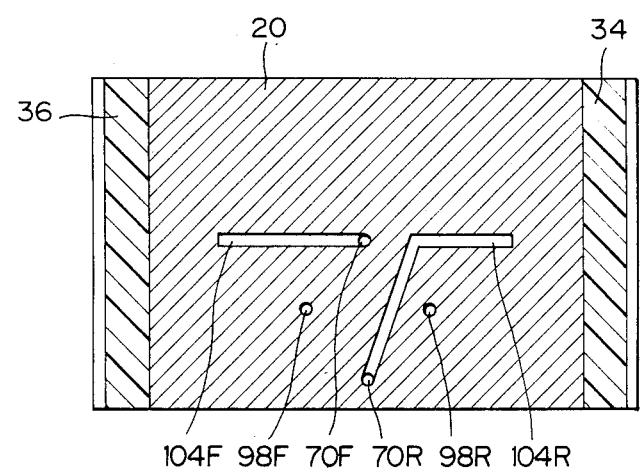
FIG. 5 is a cross-sectional view taken along the line V—V of FIG. 2.

The brake fluid is returned to the front main hydraulic passages 86FR and 86FL through a common front return passage 102F (FIG. 6) provided with the pump 42. This front return passage 102F includes the passage 98F communicated with the reservoir 60 and with the suction side of the pump 42 (FIG. 3), and a passage 104F (FIGS. 2 and 5) formed in the base 12. The passage 104F is communicated at one end with the delivery side of the pump 42. The other end of the passage 104F merges with the passage 70F (FIGS. 1 and 5) communicated with the front input port 68MF and opens into the passage 74F (FIG. 1). Thus, the brake fluid drawn from the reservoir 60 and pumped by the pump 42 will be forwarded concurrently to both front main passages 86FR and 86FL.

Figure 6:
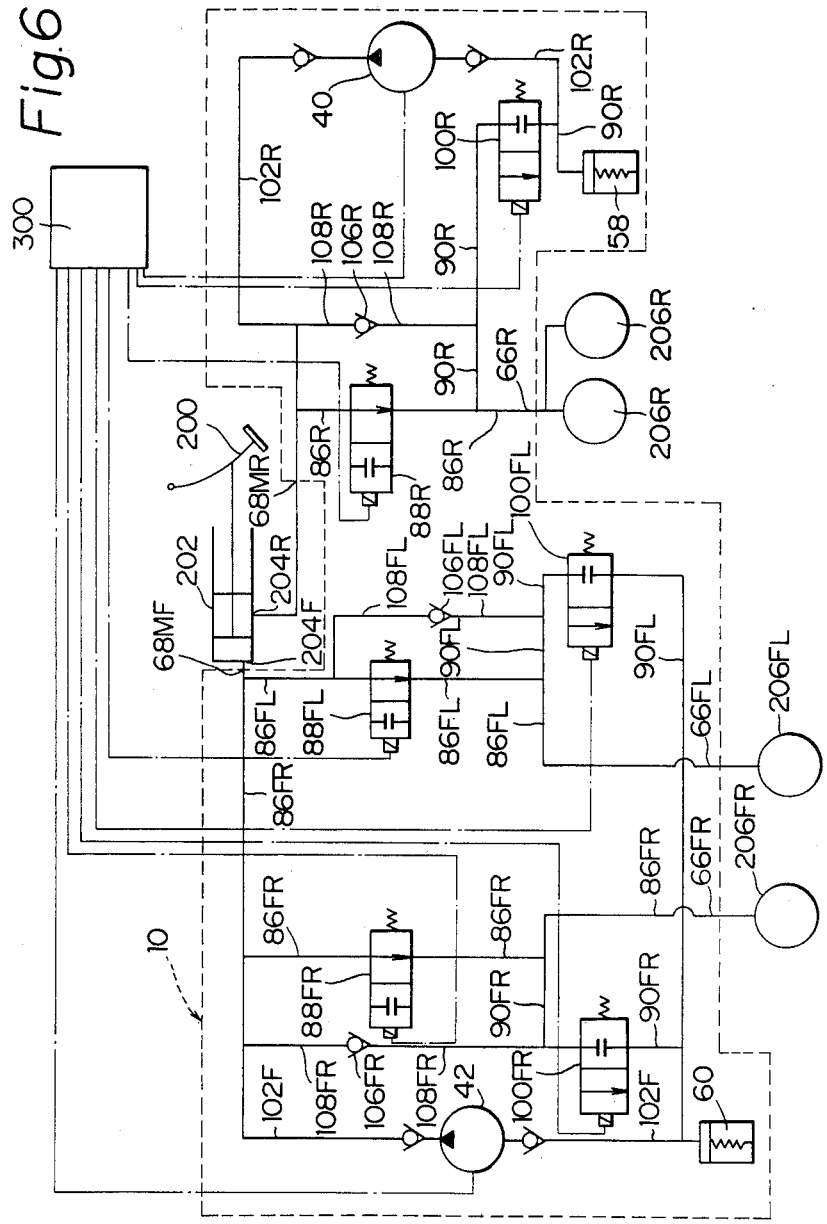
FIG. 6 is a hydraulic diagram representing the antiskid modulator when connected to a hydraulic braking system of a 4-wheeled vehicle.

The brake fluid is returned to the rear main hydraulic passage 86R through a rear return passage 102R (FIG. 6). This return passage 102R includes a passage 98R (FIGS. 1, 2 and 5) communicated with the reservoir 58 and the suction side of the pump 40, and a passage 104R (FIGS. 2 and 5) formed in the base 12. The passage 104R is connected at an end to the delivery side of the pump 40 (FIG. 2), the other end of the passage 104R being merged into the passage 70R communicated with the rear input port 68MR connected to the tandem master cylinder.

Other inner passages are also provided in the modulator body. As shown in FIG. 1, a passage 108FR with a check valve 106FR is provided between the passage 70F connected to the front input port 68MF and the passage 84FR connected to the output port 66FR, while a passage 108FL with a check valve 106FL is provided between the passage 70F and the passage 84FL. Similarly, a passage 108R with a check valve 106R is provided between the passage 70R connected to the rear input port 68MR and the passage 84R connected to the rear output port 66R.

Before describing the detailed structure of the piezoelectric shutoff valves and adjusting mechanisms therefor, the general layout of the antiskid modulator 10 as combined with the existing braking system of the vehicle will be described together with the general modes of operation.

The antiskid modulator 10 may be hydraulically and electrically connected to the hydraulic braking system of the vehicle and to a control circuit as shown in FIG. 6. The braking system includes a conventional brake pedal 200 mechanically linked to the conventional tandem master cylinder 202 with or without a brake booster. The master cylinder 202 has a front output port 204F connected through a suitable line to the front input port 68MF (FIG. 4) of the modulator and has a rear output port 204R connected to the rear input port 68MR of the modulator. The braking system further includes a front right wheel cylinder 206FR, a front left wheel cylinder 206FL, and a pair of rear wheel cylinders 206R, each operatively associated with corresponding vehicle wheels. The control circuit 300 is designed to signal the respective piezoelectric shutoff valves 88FR, 88FL, 88R, 100FR, 100FL and 100R and the electric motor 44 for the hydraulic pumps 40 and 42, in response to signal received from conventional wheel lockup detecting sensors associated with respective wheels. The wheel lockup detecting sensors may generally comprise conventional wheel sensors which are adapted to generate and transfer pulse signals in proportion to the revolutional speed of the wheels to the control circuit 300, which calculates and compares the rates of deceleration of the respective wheels and determines, in a conventional manner, that a particular wheel is about to lock when the rate of deceleration of that wheel is smaller than the rate of deceleration of other wheels.

The general modes of operation of the antiskid modulator 10 as combined with the hydraulic braking system will be described with reference to FIG. 6. When the brake pedal 200 is actuated, the hydraulic pressure generated in the master cylinder 202 is transmitted through the main hydraulic passages 86FR, 86FL, and 86R to respective wheel cylinders 206FR, 206FL, and 206R, thereby applying the brakes associated with respective wheels. When the control circuit 300 senses that any one of the wheels is about to lock, the modulator 10 is operated to control the hydraulic pressure applied to the wheel cylinders. Basically, the modulator 10 is operated in three modes; a pressure relieving mode in which the hydraulic pressure in a particular wheel or wheels is relieved to diminish the locking tendency, a pressure increasing mode in which the hydraulic pressure is again increased to restore the braking force, and a constant pressure mode in which the hydraulic pressure in the wheel cylinder or cylinders is held temporarily, at a constant pressure, between the other two modes. The last-mentioned constant pressure mode is required to ensure monitoring of the effect of skid control by temporarily maintaining the hydraulic pressure in the hydraulic circuits at a constant pressure and to enable the control circuit to compute the next command signal.

The above-mentioned three operational modes of the modulator 10 are achieved by the combined operations of the normally open piezoelectric shutoff valves 88 and the normally closed piezoelectric valves 100. Referring to the control of the hydraulic pressure applied to the front right wheel cylinder 206FR, upon sensing that the front right wheel is about to lock, the control circuit 300 energizes the normally open piezoelectric shutoff valve 88FR, thereby causing the valve 88FR to close and interrupt the fluid flow through the main hydraulic passage 86FR for the front right wheel cylinder. After a lapse of a very short time interval, which may vary from 50 to 500 microseconds, the control circuit 300 then energizes the normally closed piezoelectric shutoff valve 100FR, causing it to open and to provide fluid communication through the relief passage 90FR, whereby the front right wheel cylinder 206FR is connected to the reservoir 60 to thereby relieve the hydraulic pressure in the wheel cylinder 206FR. As a result, the braking force is reduced, thereby releasing the front right wheel.

Simultaneously with the detection of the locking tendency of the front right wheel, the control circuit 300 also energizes the electric motor 44 to bring the hydraulic pumps 40 and 42 into operation. The pump 42 draws out the brake fluid in the reservoir 60 and pumps it through the return passage 102F toward the master cylinder, whereby the portion of the main hydraulic passage 86FR located upstream of the shutoff valve 88FR is recharged with a sufficient amount of brake fluid under pressure.

Upon sensing the disappearance of the locking tendency of the front right wheel, the control circuit 300 issues signals for operating the modulator 10 in a pressure increasing mode, wherein the hydraulic pressure in the front right wheel cylinder 206FR is, again increased. That is, the control circuit 300 operates to open the piezoelectric shutoff valve 88FR in the main passage 86FR for a predetermined period of time, while keeping the piezoelectric shutoff valve 100FR in the relief passage 90FR in the closed position. This permits the hydraulic pressure in the master cylinder 202 to be transmitted to the front right wheel cylinder 206FR, thereby incrementing the pressure in that wheel cylinder. Both of the shutoff valves 88FR and 100FR are then closed for a predetermined time period to maintain the hydraulic pressure in the front right wheel cylinder 206FR. The control circuit then determines a next command in response to the signals from the wheel sensors in order to increase or decrease the wheel cylinder pressure. In this manner, by controlling the piezoelectric shutoff valves 88FR and 100FR to alternately relieve, again increase, and maintain constant the hydraulic pressure in the front right wheel cylinder 206FR, the wheel cylinder pressure is controlled to a proper value so that the front right wheel is braked without causing a locking and resultant skid of the front right wheel.

The hydraulic pressure in the front left wheel cylinder 206FL and the two rear wheel cylinders 206R is controlled in a similar manner, and therefore, a description of the pressure control for these wheel cylinders will not be necessary. In this regard, however, it will be noted that, whereas the hydraulic pressure in the two front wheel cylinders 206FR and 206FL is controlled independently, the pressure in the two wheel cylinders 206R is controlled in common since both of the rear wheel cylinders are connected in common to the rear main hydraulic passage 86R.

Returning to FIG. 1, the piezoelectric shutoff valves and the adjusting mechanism therefor will be described. The three piezoelectric shutoff valves 88FR, 88FL, and 88R are of the normally open type and the other three valves 100FR, 100FL, and 100R are of the normally closed type. As the normally open piezoelectric valves are identical with each other, only one, e.g., the valve 88FR, will be described.

The piezoelectric shutoff valve 88FR includes a piezoelectric actuator 150 which, per se, is well known in the art. The piezoelectric actuator 150 has a stack 152 of piezoelectric discs of piezoelectric material such as lead zirconate titanate, each disc having a diameter of about 12 mm and a thickness of about 0.5 mm. The stack may comprise from 80 to 100 piezoelectric discs. The discs are stacked alternately in opposite polarities and are interleaved by metal foil electrodes which are connected alternately to a plus lead wire 154 and a minus lead wire 156, which are connected to a socket 158 mounted to the cover 34. The socket 158 may be connected to a cable 160 leading from the control circuit 300 (FIG. 6). In the illustrated embodiment, the piezoelectric stack 152 has such a characteristic that it will expand upon the application of a voltage. However, a piezoelectric stack having an opposite characteristic may be used. The piezoelectric stack 152 will be expanded by about 40 μm by applying a voltage of 500 V between the plus an minus lead wires 154 and 156.

The stack 152 of the piezoelectric actuator 150 is sandwiched between a pair of insulating plates 162 and 164. The insulating plate 162 is supported by an adjusting screw 166 threadingly engaging the cover 38. The other insulating plate 164 is urged to the left as viewed in FIG. 1 by a Belleville spring 168 seated on the bottom of the housing 30, so as to impart a preloading to the piezoelectric stack 152. The insulating plate 164 has an integral axial projection 170 which fluid tightly extends through the bottom wall of the housing 30 into the passage 80FR formed in the valve plate 26. Fixed to the free end of the projection 170 is a movable closure member such as a steel ball 172, which operates with an associated valve seat 174 to open and close the passage 80FR. When the voltage is applied from the control circuit 300 to the piezoelectric actuator 150, the piezoelectric stack 152 will axially expand by a small amount to urge the ball 172 into engagement with the valve seat 174 and close the passage 80FR. When the voltage is released, to allow the piezoelectric stack to contract, the ball 172 will move away from the associated valve seat 174 and thereby provide a fluid flow through the passage 80FR. In FIG. 1, the three piezoelectric shutoff valves 88FR, 88FL, and 88R are shown in their normally open position.

The normally closed piezoelectric valves 100FR, 100FL, and 100R are provided with piezoelectric actuators and adjusting screws similar to the above mentioned actuator 150 and adjusting screw 166. Since these three normally closed piezoelectric valves are identical in structure, only the valve 100FR will be described. The piezoelectric shutoff valve 100FR includes a valve seat 176 formed across the passage 92FR. A closure member such as a steel ball 178 is spring biased against the valve seat 176 to normally close the passage 92FR. An adjusting screw 180 threadingly engaging the cover 36 is adjusted in such a manner that when the piezoelectric actuator of the piezoelectric shutoff valve 100FR, is de-energized, the free end of projection 184 integral with an insulating plate 182 moves away from the ball 178, and that when piezoelectric actuator is energized, the free end is brought into engagement with the ball 178 causing it to move away from the associated valve seat 176. Therefore, the piezoelectric shutoff valve 100FR is normally closed to interrupt fluid flow through the passage 92FR but is opened to provide fluid flow therethrough upon energization of the piezoelectric actuator thereof. It will be noted that all three normally closed piezoelectric shutoff valves 100FR, 100FL, and 100R are shown in FIG. 1 as being in their normally closed position. For simplicity, lead wires and connecting sockets for the piezoelectric valves 88FL, 88R, 100FR, 100FL, and 100R are omitted from FIG. 1. Also, only the socket 186 for the piezoelectric valve 100FR is shown in FIG. 3, the other sockets being omitted also for simplicity.

It will be noted that the amount of expansion and contraction of a piezoelectric stack is very small, so that when a shutoff valve is designed to be operated by a piezoelectric actuator the displacement of a movable closure member as caused by the expansion and contraction of the piezoelectric stack is very limited. Therefore, in a piezoelectric shutoff valve, it is essential that the clearance between the closure member and the cooperating valve seat be adjusted as accurately as possible in order to ensure proper operation of the valve. According to the invention, this is accomplished by turning the adjusting screws, such as the screw 166, of the respective piezoelectric actuators in either direction until the axial position of the respective piezoelectric stack is adjusted to provide an optimal clearance between the respective closure members and valve seats.

It will be appreciated that, in the illustrated embodiment, the normally-open piezoelectric shutoff valve and the normally-closed piezoelectric shutoff valve that cooperate with each other to control the hydraulic pressure in one hydraulic circuit are arranged in the modulator body opposite to each other and are aligned coaxially so that the adjusting screws are arranged to face the lateral sides of the modulator body. This facilitates access to the adjusting screws and simplifies the adjusting operation. Furthermore, the coaxial opposite arrangement of the valves enables a simplification of the design of various inner passages formed in the modulator body, to provide a compact modulator.

In summary, the antiskid pressure modulator according to the invention is capable of controlling the hydraulic pressure in the hydraulic braking system at a much higher responsiveness as compared with the conventional modulator equipped with solenoid operated shutoff valves, because the inner passages of the modulator are controlled by the piezoelectric shutoff valves. Therefore, the braking system incorporating the modulator according to the invention enables the vehicle to be stopped within a reduced braking distance. Furthermore, the use of piezoelectric shutoff valves ensures a compact, light weight modulator.

The adjusting mechanisms including the adjusting screws ensures an accurate axial positioning of the piezoelectric stacks so that the valve clearance is adjusted to provide a proper functioning of the valves.

While the present invention has been described herein with reference to the specific embodiment thereof, it should be understood that the present invention is not limited thereby and various changes and modifications may be made therein within the scope of the present invention. For example, the modulator has been described as incorporating three independent hydraulic circuits for the front right wheel cylinder, the front left wheel cylinder, and the rear wheel cylinder. However, in simplest form, the modulator may comprise two piezoelectric shutoff valves controlling a single hydraulic circuit which may be connected to all of the wheel cylinders. Such a simplest form of modulator will be readily achieved by omitting from the illustrated embodiment the other two hydraulic circuits and associated piezoelectric shutoff valves.

Similarly, in another form, the modulator may comprise two independent hydraulic circuits each of which is controlled by a pair of normally open piezoelectric shutoff valves and normally closed piezoelectric shutoff valves. This is accomplished by omitting one of the front hydraulic circuits or the rear hydraulic circuit from the illustrated embodiment.

Also, the adjusting mechanisms have been described as comprising adjusting screws. However, other adjusting mechanisms such as shims, etc., may be used.

We claim:

1. An antiskid hydraulic pressure modulator for adjusting hydraulic pressure applied from a master cylinder to a wheel cylinder of a vehicular hydraulic braking system, which comprises:

(a) a body having a main hydraulic passage for transmitting the hydraulic pressure from the master cylinder to the wheel cylinder and a pressure relief passage for relieving the hydraulic pressure in the wheel cylinder;
(b) a normally open first shutoff valve in said body for providing and interrupting fluid flow through said main passage;
(c) a first piezoelectric actuator received in said body for operating said first shutoff valve in response to variations in voltage applied thereto, said first piezoelectric actuator having and elongated piezoelectric element;
(d) a normally closed second shutoff valve in said body for providing and interrupting fluid flow through said relief passage; and
(e) a second piezoelectric actuator received in said body for operating said second shutoff valve in response to variations in voltage applied thereto, said second piezoelectric actuator having an elongated piezoelectric element.

2. A modulator according to claim 1, further comprising first adjusting means for adjusting the axial position of said piezoelectric element of said first actuator and second adjusting means for adjusting the axial position of said piezoelectric element of said second actuator, said first and second adjusting means being arranged to lateral sides of said body.

3. A modulator according to claim 2, wherein said body has a pair of opposite lateral sides, said first adjusting means being arranged to one of said lateral sides, said second adjusting means being arranged at the other lateral side.

4. A modulator according to claim 3, wherein said first shutoff valve, first piezoelectric actuator, and first adjusting means are aligned coaxially with and opposite to said second shutoff valve, second piezoelectric actuator, and second adjusting means, respectively.

5. An antiskid hydraulic pressure modulator for adjusting hydraulic pressure applied from a master cylinder to a wheel cylinder of a vehicular hydraulic braking system, which comprises:

(a) a body having a main hydraulic passage for transmitting the hydraulic pressure from the master cylinder to the wheel cylinder, a pressure relief passage for relieving the hydraulic pressure in the wheel cylinder, and a return passage for returning relieved brake fluid to said main passage;
(b) a normally open first shutoff valve in said body for providing and interrupting fluid flow through said main passage;
(c) a first piezoelectric actuator received in said body for operating said first shutoff valve in response to variations in voltage applied thereto, said first actuator having an elongated piezoelectric element;
(d) first adjusting means for adjusting the axial position of said piezoelectric element of said first actuator;
(e) a normally closed second shutoff valve in said body for providing and interrupting fluid flow through said relief passage;
(f) a second piezoelectric actuator received in said body for operating said second shutoff valve in response to variations in voltage applied thereto, said second actuator having an elongated piezoelectric element;

(g) second adjusting means for adjusting the axial position of said piezoelectric element of said second actuator;

(h) a reservoir mounted to said body for storing the brake fluid released through said pressure relief passage; and (i) a hydraulic pump mounted to said body for pumping the brake fluid in said reservoir toward said return passage.

6. An antiskid modulator according to claim 5, wherein said first and second adjusting means are located at the lateral sides of said body.

7. An antiskid modulator according to claim 6, further comprising passage means in said body for providing fluid communication between said return passage and the portion of said relief passage located upstream of said second shutoff valve, and check valve means in said passage means for permitting the brake fluid to flow therethrough only in the direction of from said relief passage to said return passage.

8. An antiskid hydraulic pressure modulator for independently controlling hydraulic pressure applied from a master cylinder to two independent wheel cylinders of a hydraulic braking system of a vehicle, which comprises:

(a) a body having two main hydraulic passages for independently transmitting the hydraulic pressure form the master cylinder to respective wheel cylinders, two relief passages for independently relieving the hydraulic pressure in respective wheel cylinders, and a common return passage for returning relieved brake fluid to said main passages;

(b) a normally-open first piezoelectric shutoff valve, provided in said body for each of said two main passages, for providing and interrupting fluid flow through said main passages, said first shutoff valve having an axially extending piezoelectric element;

(c) a normally-closed second piezoelectric shutoff valve, provided in said body for each of said two relief passages, for providing and interrupting fluid flow through said relief passages, said second shutoff valve having an axially extending piezoelectric element;

(d) a reservoir mounted to said body for storing the brake fluid relieved through said relief passages;

(e) a hydraulic pump mounted to said body for pumping the brake fluid in said reservoir to said return passage; and (f) adjusting means, provided for each of said first and second shutoff valves, for adjusting the axial position of said piezoelectric elements of said shutoff valves, said shutoff valves and said adjusting means being arranged in such a manner that said adjusting means are located at the lateral sides of said body.

9. An antiskid modulator according to claim 8, wherein two of said first and second piezoelectric shutoff valves are arranged in pairs opposite to each other and wherein the piezoelectric shutoff valves of different pairs are arranged adjacent to each other.

10. An antiskid hydraulic pressure modulator for controlling hydraulic pressure in a hydraulic braking system of a vehicle, said braking system including a tandem master cylinder with first and second delivery ports, a first group of wheel cylinders operatively associated with a first group of vehicle wheels, and a second group of wheel cylinders operatively associated with a second group of vehicle wheels, said modulator comprising:

(a) a body having a pair of first main hydraulic passages for independently transmitting the hydraulic pressure from said first delivery port of the master cylinder to said first group of wheel cylinders, a pair of first relief passages for independently relieving the hydraulic pressure in said first group of wheel cylinders, a first common return passage for returning brake fluid relieved through said first relief passages back to said first main passages, a second main hydraulic passage for transmitting the hydraulic pressure from said second delivery port of the master cylinder to said second group of wheel cylinders, a second relief passage for relieving the hydraulic pressure in said second group of wheel cylinders, and a second common return passage for returning brake fluid relieved through said second relief passage back to said second main passage;

(b) a normally-open first piezoelectric shutoff valve, provided in said body for each of said main hydraulic passages, for providing and interrupting fluid flow therethrough, said first piezoelectric shutoff valve having a column of piezoelectric elements;

(c) a normally-closed second piezoelectric shutoff valve, provided in said body for each of said relief passages, for providing and interrupting fluid flow therethrough, said second piezoelectric shutoff valve having a column of piezoelectric elements;

(d) a first reservoir mounted to said body for storing the brake fluid relieved through said first relief passage;

(e) a second reservoir mounted to said body for storing the brake fluid relieved through said second relief passage;

(f) a first hydraulic pump mounted to said body for pumping the brake fluid in said first reservoir to said first return passage;

(g) a second hydraulic pump mounted to said body for pumping the brake fluid in said second reservoir to said second return passage; and (h) adjusting means, provided for each of said first and second piezoelectric shutoff valves, for adjusting the axial position of said piezoelectric element of each corresponding shutoff valve, said shutoff valves and associated adjusting means being arranged in such a manner that said adjusting means are located at the lateral sides of said body.

11. An antiskid pressure modulator according to claim 10, wherein said first piezoelectric shutoff valves are arranged opposite to and coaxially aligned with said second piezoelectric shutoff valves, respectively.

12. An antiskid pressure modulator according to claim 11, wherein said body has a pair of opposite lateral sides and wherein said adjusting means are grouped into two groups, each group of adjusting means being arranged to respective lateral sides of the body.

13. An antiskid pressure modulator according to claim 12, wherein the adjusting means at each lateral side of the body are arranged adjacent to and vertically aligned with each other.

14. An antiskid pressure modulator according to claim 10, further comprising passage means, provided in said body for each of said relief passages, for providing fluid communication between the portion of said relief passage located upstream of said second shutoff valve and said associated return passage, and a check valve in said passage means for permitting the brake fluid to flow through said passage means only in the direction of from said relief passage to said return passage.

* * * * *